(12) United States Patent
Kalavsky et al.

(10) Patent No.: US 8,110,958 B2
(45) Date of Patent: Feb. 7, 2012

(54) ROTOR COVER WITH ROTOR FINS EXTENDING BETWEEN STATOR SLOTS

(75) Inventors: Michal Kalavsky, Kosice (SK); Jörg Skrippek, Priort (DE); Robert Valo, Michalovce (SK)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 232 days.

(21) Appl. No.: 12/064,661

(22) PCT Filed: Aug. 1, 2006

(86) PCT No.: PCT/EP2006/064883
§ 371 (c)(1),
(2), (4) Date: May 29, 2008

(87) PCT Pub. No.: WO2007/023070
PCT Pub. Date: Mar. 1, 2007

(65) Prior Publication Data
US 2009/0015084 A1  Jan. 15, 2009

(30) Foreign Application Priority Data

Aug. 23, 2005 (DE) .......................... 10 2005 039 884

(51) Int. Cl.
  *H02K 3/48* (2006.01)
  *H02K 3/34* (2006.01)
  *H02K 5/00* (2006.01)
  *H02K 5/10* (2006.01)
  *H02K 5/12* (2006.01)
  *H02K 17/28* (2006.01)

(52) U.S. Cl. ............ 310/214; 310/215; 310/89; 310/85; 310/86; 310/54

(58) Field of Classification Search .................... 310/89, 310/186, 215, 214, 85, 86, 87, 54, 400–433, 310/52; *H02K 5/10, 5/12, 5/00, 1/16, 3/16, H02K 3/20, 3/48, 3/34*
See application file for complete search history.

(56) References Cited

U.S. PATENT DOCUMENTS
3,873,861 A   3/1975   Halm
(Continued)

FOREIGN PATENT DOCUMENTS
DE    939 339    2/1956
(Continued)

OTHER PUBLICATIONS
International Search Report dated Nov. 15, 2006.

*Primary Examiner* — Quyen Leung
*Assistant Examiner* — Terrance Kenerly
(74) *Attorney, Agent, or Firm* — Laurence A. Greenberg; Werner H. Stemer; Ralph E. Locher

(57) ABSTRACT

An electric motor has a rotor, a stator encompassing the rotor, at least one bearing bracket, and a rotor cover. The rotor cover has at least one cover cap extending from the bearing bracket to at least the front face of the stator, which faces the bearing bracket. The invention also relates to a rotor cover for an inner rotor motor, having at least one cover cap and cover fins adjoining the cover cap. The cover cap has a tapering portion from the side where the cover fins are mounted. The cover fins have a length corresponding to at least half of the length of the stator of the electric motor.

13 Claims, 3 Drawing Sheets

U.S. PATENT DOCUMENTS

| | | | |
|---|---|---|---|
| 4,075,522 A * | 2/1978 | Hoffman | 310/214 |
| 4,190,794 A * | 2/1980 | Mikulic | 318/831 |
| 4,400,140 A * | 8/1983 | Papst | 417/354 |
| 4,633,109 A | 12/1986 | Feigel | |
| 5,317,224 A | 5/1994 | Regaly | |
| 6,384,505 B1 * | 5/2002 | Horng et al. | 310/186 |
| 6,515,384 B1 * | 2/2003 | Kikuchi et al. | 310/58 |
| 6,700,253 B1 | 3/2004 | Ohnuma et al. | |
| 6,933,633 B2 * | 8/2005 | Kaneko et al. | 310/52 |
| 6,960,856 B2 | 11/2005 | Reimann | |
| 6,979,921 B2 | 12/2005 | Misaki | |
| 7,635,934 B2 * | 12/2009 | Zhu et al. | 310/88 |
| 2003/0038549 A1 * | 2/2003 | Pyrhonen | 310/58 |
| 2003/0230950 A1 * | 12/2003 | Reimann | 310/192 |
| 2004/0090137 A1 | 5/2004 | Bildstein | |
| 2005/0151435 A1 * | 7/2005 | Misaki | 310/89 |
| 2006/0043801 A1 * | 3/2006 | Adra | 310/54 |

FOREIGN PATENT DOCUMENTS

| | | |
|---|---|---|
| DE | 1 797 835 | 10/1959 |
| DE | 3438747 A1 | 4/1986 |
| DE | 40 03 155 A1 | 8/1991 |
| DE | 100 25 190 A1 | 12/2001 |
| EP | 1 158 175 A2 | 11/2001 |
| EP | 1231701 A1 | 8/2002 |
| EP | 1383227 A2 | 1/2004 |
| WO | 03/038972 A1 | 5/2003 |

* cited by examiner

ROTOR COVER WITH ROTOR FINS EXTENDING BETWEEN STATOR SLOTS

BACKGROUND OF THE INVENTION

Field of the Invention

The present invention relates to a rotor cover, in particular to a rotor cover for an electric motor for water-carrying domestic appliances and also to an electric motor, in particular for water-carrying domestic appliances.

It can happen with electric motors that particles of dirt that are present in the vicinity of the electric motor can get inside the motor and possibly cause malfunctions. In particular, in electric motors the rotor of which is equipped with permanent magnets or electromagnets, metal particles can be attracted by the magnets, get between the rotor and stator of the electric motor and cause damage.

In order to prevent this, it is possible to use bearing plates which are completely sealed and thus cover the motor's stator and rotor. The disadvantage of such sealed bearing plates is that the stator and the rotor cannot be cooled by a cooling medium that flows through them, such as the ambient air, for example, or a fluid conveyed by a pump that is driven by the motor. This leads to an increase in temperature and thus a reduced performance.

Furthermore, DE 1 797 835 discloses an insulation groove for the armature and stand of an electrical appliance wherein insulating rods are inserted into the armature grooves and a basket-type groove seal comprising groove sealing wedges is subsequently pushed into the armature grooves. This groove seal is mounted on the shaft and rotates with the rotor of the electrical appliance. On the stator of this appliance, a groove seal is likewise inserted into the stator grooves. This seal is constructed in two parts, with both parts protruding at the axial ends of the stator after they have been inserted into the stator grooves and the projecting section is radially curved outwards. The stator's winding heads are covered by the projecting section and thus protected.

Finally, EP 1 376 822 A1 discloses an electric motor wherein a rigid insulating cover is provided between the stator and the rotor, said cover being arranged in such a way that the stator is protected by a fluid medium.

In particular, at the input end for the fluid medium, the insulating cover is connected at the edge to the motor housing, runs down the length of the stator between the stator and the rotor and is sealed at the opposite end. A bearing for the rotor shaft is provided in the insulating cover at this sealed end.

The disadvantage of these known electric motors is that, when the rotor is insulated as described in DE 1 797 835, it is possible for metal parts that drop through the stator grooves to get into the gap between the stator and the rotor and possibly lead to the rotor becoming blocked there. If the additional groove seal for the stator that is described in that document is provided, then the stator cannot be cooled sufficiently since the protruding section of the groove seal covers the front faces of the stator. In the insulating cover described in EP 1 376 822 A1, the entry of particles, in particular metal particles, into the air gap between the rotor and the stator likewise cannot be prevented nor likewise can any locking of the rotor resulting therefrom.

BRIEF SUMMARY OF THE INVENTION

The present invention therefore addresses the problem of providing a solution which leads to an unencumbered operation of an electric motor even where there are metallic impurities in the vicinity of the electric motor and without leading to a temperature increase in the motor.

According to a first aspect, the object is achieved by an electric motor comprising a rotor, a stator surrounding the rotor, at least one bearing plate and a rotor cover. The electric motor is characterized in that the rotor cover comprises at least one cover cap extending from the bearing plate to at least the front face of the stator which faces this bearing plate.

In particular, the bearing plate is a front bearing plate which is the first bearing plate in the flow direction of a medium that flows through the electric motor or enters the electric motor or in the direction in which metal dirt particles in particular drop down. The use of a cap as the front part of the rotor cover has in particular the advantage that this cap is simple to manufacture, for example by deep drawing or injection molding. Because the cover cap covers the area between the front bearing plate and the front face of the stator, a clear division is established in this intermediate space between the stator area and the rotor area. Whilst the entry into the stator of the fluid medium that flows through is permitted, any flow onto the rotor and particularly into the air gap between the rotor and the stator is prevented. Thus it is similarly impossible for any particles that could lead to a blocking of the rotor to be introduced into this air gap.

The cover cap is preferably fitted to the bearing plate adjacent to the inlet for the rotor shaft of the electric motor. The cover cap can be fitted by placing it on a suitable protruding section on the inside of the bearing plate. The cap thus concentrically includes the inlet for the rotor shaft. As a result of the cover cap being fitted adjacent to said inlet for the rotor shaft, the part of the bearing plate in which inlet openings for the cooling medium can be provided and the stator area into which the cooling medium can penetrate is maximized. Moreover, the cover cap extends from the site where it is mounted on the bearing plate as far as the stator and preferably as far as the inside of the stator, such that this results in a surface that is inclined towards the direction of the main flow, which leads to improved flow ratios.

In one embodiment, the cover has cover fins adjoining the at least one cover cap, the width of which corresponds at least to the width of the stator grooves in the stator and the length of which corresponds to at least part of the length of the stator. Stator grooves in this context denote the clearance between two adjacent stator poles. The width of the stator grooves designates in particular the clearance between adjacent stator poles on the inside of the stator. The length of the stator designates the axial dimension of the stator, which is generally formed from a number of stator plates. As a result of cover fins being provided, it is also possible to prevent any radial entry of particles into the air gap between the rotor and the stator. The air gap is thus fully protected by the cover at least in the main flow direction or in the direction in which metal particles could drop down, and in the radial direction. As a result of the fact that the width of the cover fins corresponds at least to the width of the stator grooves, the fins can be accommodated into the stator grooves and seal the stator grooves. The width of the cover fins is preferably greater than the width of the stator grooves on the inside of the stator. In this embodiment, the cover fins can be accommodated in the stator grooves, which extend from the inside of the stator, as a result of which the secure fixing of the cover fins and the sealing of the stator grooves are improved.

The cover fins can be connected to the at least one cover cap. The connection can be achieved via recesses provided in the cover cap in which the cover fins can be accommodated and secured, for example, by gluing or welding. Alternatively, the cover fins can molded onto the cover cap in one piece. In this embodiment the fitting of the rotor cover is further simplified since after manufacture the cover consists of only one piece.

Alternatively, the cover fins can consist of insulating foil. In this embodiment the cover fins may have the shape of slots or troughs. These are provided directly on the stator grooves and in this embodiment the cover cap is generally a separate component that optionally engages with the inside of the stator.

The rotor cover can also include two cover caps fitted onto facing bearing plates. In this embodiment, the entry of particles into the air gap is also prevented from the end that is turned away from the main flow direction or from the direction in which the particles fall. This embodiment, in particular in conjunction with cover fins, can be advantageous where an electric motor is inserted at a point where there is no directed flow.

According to one embodiment, the electric motor may be a pump motor with an integral pump. The electric motor according to the invention is especially suitable for domestic appliances, in particular water-carrying domestic appliances such as washing machines or dishwashers. Furthermore, the electric motor can also serve as a drive motor for a water-carrying domestic appliance.

The rotor cover according to the invention is particularly suitable for synchronous motors. In these motors the attraction of metallic particles by the magnetic rotor must be avoided. At the same time, however, as a result of the rotor's being covered, cooling of the motor is unnecessary because of the lower rotor temperature than in asynchronous motors.

According to a further aspect of the invention, the invention relates to a rotor cover for covering the rotor of an electric motor, said cover including at least one cover cap and cover fins adjoining the cover cap. The rotor cover is characterized in that the cover cap tapers from the end where the cover fins are mounted, said cover fins having a length corresponding to at least half of the length of the stator of the electric motor. The at least one cover cap can be configured in one piece with the cover fins or as a separate component.

The rotor cover preferably consists of a dielectric and non-magnetic material, such as plastic, for example.

Features and advantages that are described with respect to the electric motor also apply accordingly, insofar as they are applicable, to the rotor cover and vice versa.

BRIEF DESCRIPTION OF THE SEVERAL VIEWS OF THE DRAWING

The invention is described again below with reference to the attached drawings. The drawings show.

DESCRIPTION OF THE INVENTION

Figure 1:
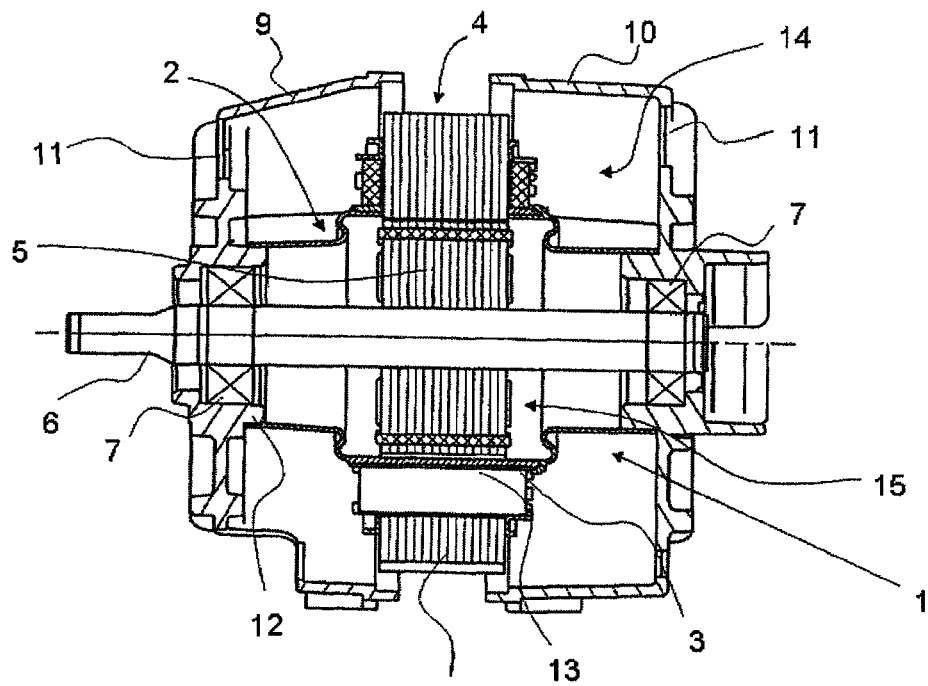
FIG. 1: a diagrammatic cross-section view of an embodiment of a motor according to the invention.

FIG. 1 shows a rotor cover 1 which includes two cover caps 2 and cover fins 3 located between said cover caps. The rotor cover 1 is inserted into an electric motor 4. The electric motor 4 is an internal rotor motor comprising a rotor 5 that is secured on a shaft 6. The shaft 6 is secured by bearings 7. The stator 8 surrounds the rotor 5.

The motor 4 further comprises a front bearing plate 9 and a rear bearing plate 10, both of which are conical in shape and which cover the front faces of the stator 8 and of the rotor 5. In the bearing plates 9 and 10 are the bearings 7, by means of which the shaft 6 of the rotor 5 is mounted. Furthermore, the bearing plates 9 and 10 are configured to be permeable and have in particular apertures 11 through which a medium flowing round the motor 4, in particular a fluid or air, can at least partially flow.

On the inside of the bearing plates 9 and 10, protrusions 12 are provided in the region of the inlet for the shaft 6, said protrusions protruding around the inlet in an annular shape towards the motor 4. The cover caps 2 are fitted onto said protrusions 12, that is, they surround said protrusions 12. The front cover cap 2 extends from the bearing plate 9 as far as the front face of the stator 8.

The cover fins 3 that adjoin the cover caps 2 rest in the stator grooves 13 of the stator 8 and seal off said grooves. The cover caps 2 and the cover fins 3, together with the inner sides of the stator poles between which the cover fins are arranged, delimit a stator region 14 from a rotor region 13, the rotor region 13 also including the air gap between the rotor and the stator. Since the apertures 11 in the bearing plates 9 and 10 are in the stator region 14, said region can be cooled sufficiently. At the same time, the rotor cover 1 prevents the entry of particles, in particular of metal particles into the air gap between the rotor and the stator.

Figure 2:
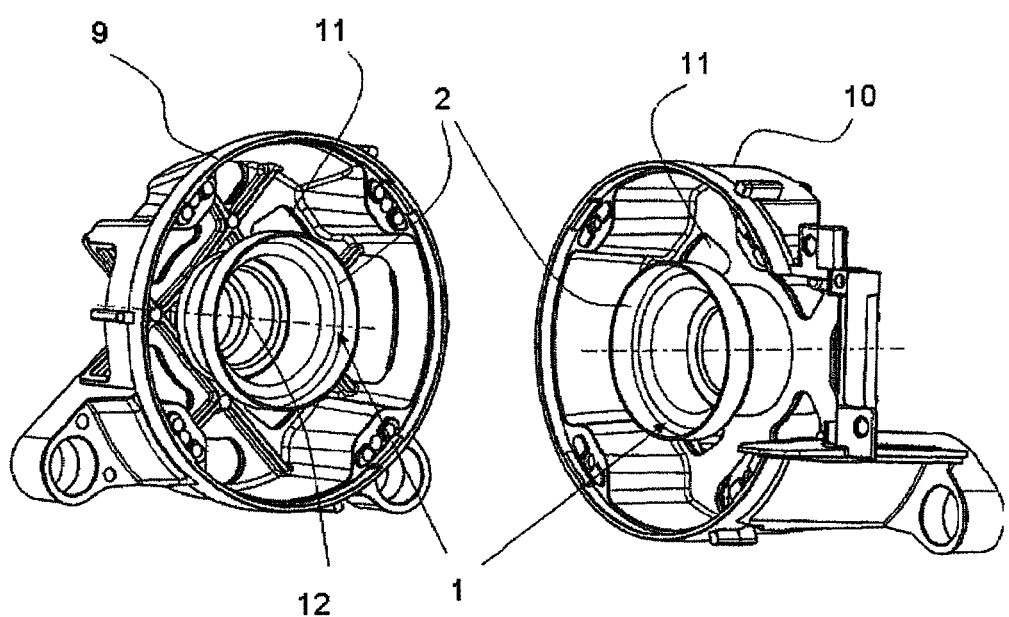
FIG. 2: a diagrammatic perspective view of bearing plates comprising cover caps according to an embodiment of the invention.

FIG. 2 shows an embodiment of the bearing plates of an embodiment of a motor according to the invention. In this embodiment, the rotor cover 1 consists exclusively of the cover caps 2 fitted onto the bearing plates 9 and 10, which caps are provided on the protrusions 12 on the inner sides of the bearing plates 9 and 10.

Figure 3:
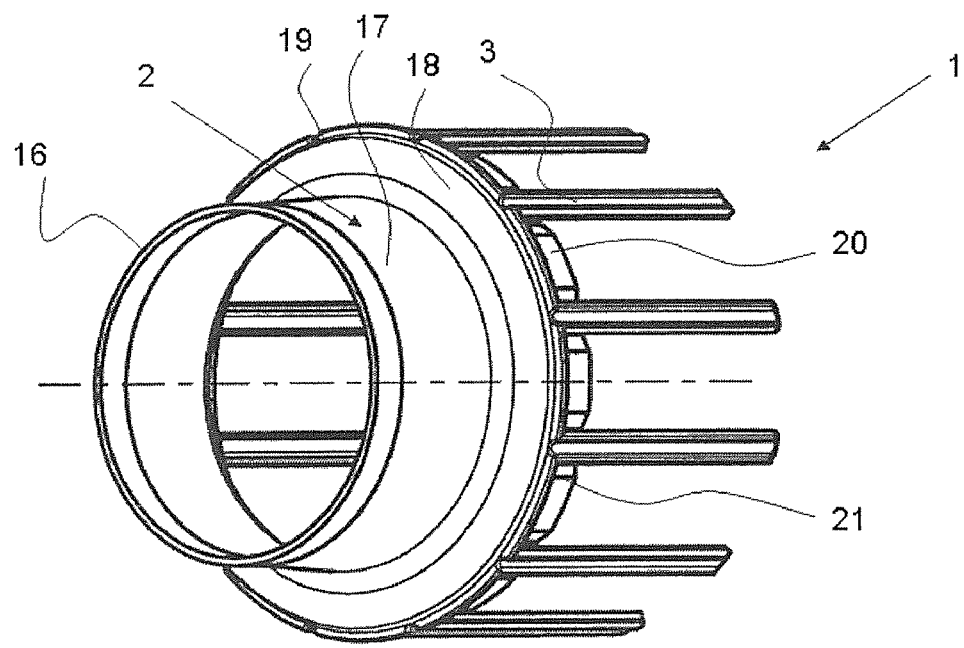
FIG. 3: a perspective view of an embodiment of a rotor cover according to the invention.

FIG. 3 shows an embodiment of a rotor cover 1 according to the invention. The cover cap 2 has an essentially conical shape. At the front, the cover cap consists of a cylindrical bush, through which the cover cap 2 can be engaged with the protrusion 12 of the bearing plates 9 and 10. A conical region 17 adjoins said bush 16. This region culminates in a cover ring 18 that is vertical to the axis of the cover cap 2. Around the circumference of the cover ring 18, recesses 19 are provided into which the cover fins 3, which are connected to the cover cap 2 can engage. A flange 20 extends on the side of the cover ring 18 that is averted from the bush 16. In said flange 20, slots 21 are provided in which the cover fins 3 are retained. As a result thereof, the connection between the cover cap 2 and the cover fins 3 is improved. In the embodiment shown in FIG. 3 the cover fins 3 are parts manufactured in sections, said parts being connected by the cover cap 2. The sections are selected such that they correspond to the shape of the stator grooves 13 at the end that faces the rotor 5. In particular, the cover fins 3 are configured as slots that can be inserted into the stator grooves 13 and with the slot bases thereof cover the width of the stator grooves 13 at the end that is turned towards the rotor 5. The number of cover fins 3 corresponds to the number of stator grooves 13 present in the stator 8.

Figure 4:
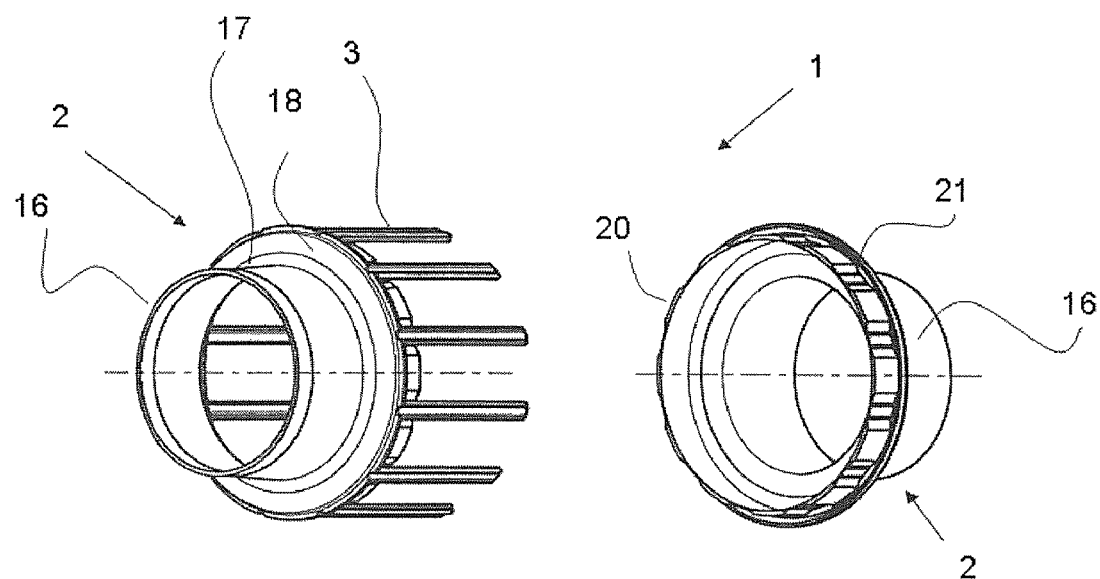
FIG. 4: a perspective exploded view of a further embodiment of a rotor cover according to the invention.

FIG. 4 shows a further embodiment of the rotor cover 1 according to the invention. This embodiment essentially corresponds to the embodiment in FIG. 3, but has a second cover cap 2 which can be fitted onto the free ends of the cover fins 3. In this embodiment, the fitting of the rotor cover 1 is achieved in two steps. First the cover cap 2, on which the cover fins 3 are provided, is inserted at one end into the stator grooves 13 until the cover fins 3, which have a length that essentially corresponds to the axial length of the stator 8, are completely resting in the stator grooves 13. The second cap 2 is subsequently fitted onto the stator 8 and the slots 21 in the flange 20 engage with the cover fins 3.

Figure 5:
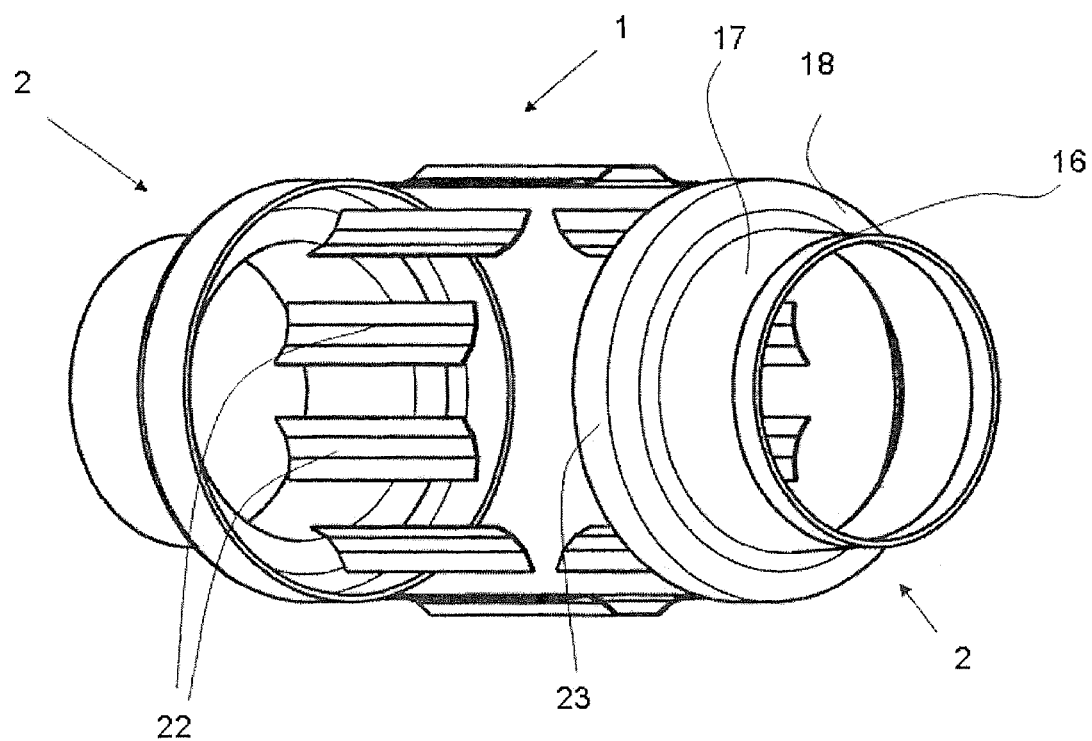
FIG. 5: a perspective exploded view of a further embodiment of a rotor cover according to the invention.

FIG. 5 shows a further embodiment of the rotor cover 1 according to the invention. In this embodiment, the cover fins are replaced by insulating strips 22 which are inserted into the stator grooves 13 and essentially have the shape of slots. The rotor cover 1, which is separated therefrom comprises two cover caps 2, which essentially have the design described with respect to FIG. 3. In this embodiment, however, the flange is not provided with slots but is a continuous flange 23 provided on the outer circumference of the cover ring 18.

In this embodiment, first the insulating strips 22 can be inserted into the stator grooves 13 and subsequently the cover caps 2 can be fitted onto the stator 8, with the flange 23 of the cover ring 18 preferably engaging into the internal diameter of the stator 8.

The present invention thus makes it possible to create a sealed rotor chamber by means of the rotor chamber together with the bearing plates and the stator teeth or stator poles. As a result of this chamber it is possible to prevent the entry of particles, in particular of metal particles into the air gap of the motor, through which the motor's magnetic rotor could become blocked.

Furthermore, the present invention allows the use of bearing plates in which ventilation openings are provided, as a result of which a better motor cooling and thus a better motor performance can be achieved.

The invention claimed is:

1. In an electric motor having a rotor, a stator having a given length and being formed with stator grooves having a given width, and a rotor shaft, a rotor cover for covering the rotor of the electric motor, comprising:
   at least one cover cap configured to be fitted into an interior space defined by a bearing plate of the electric motor adjacent an inlet for the rotor shaft;
   cover fins adjoining said cover cap and mounted to an end of said cover cap; and
   said cover cap cooperating with the bearing plate to allow a medium to flow to the stator;
   said cover cap tapering from the end on which said cover fins are mounted; and
   said cover fins having a length corresponding to at least one half of the given length of the stator and a width corresponding with the given width of the stator grooves formed in the stator of the electric motor.

2. The rotor cover according to claim 1, wherein said at least one cover cap is configured in one piece together with said cover fins.

3. The rotor cover according to claim 1, wherein said cover fins consist of insulating foil.

4. The rotor cover according to claim 1, wherein the stator has a front side facing the bearing plate; the bearing plate has a passage for the rotor shaft; said cover cap is located adjacent the passage of the bearing plate, and said cover cap extends from the bearing plate up to at least the front side of the stator.

5. The rotor cover according to claim 1, further comprising an integral component including said cover cap and said cover fins mounted to said end of said cover cap; said integral component formed before said cover cap and said cover fins are fitted into the interior space.

6. An electric motor, comprising:
   a rotor, a stator having a given length and being formed with stator grooves having a given width, and a rotor shaft, said stator surrounding said rotor;
   at least one bearing plate; and
   a rotor cover for covering the rotor of the electric motor, said rotor cover including:
      at least one cover cap fitted into an interior space defined by said bearing plate, said cover cap adjacent an inlet for the rotor shaft;
      cover fins adjoining said cover cap and mounted to an end of said cover cap; and
      said cover cap cooperating with the bearing plate to allow a medium to flow to the stator;
      said cover cap tapering from the end on which said cover fins are mounted; and
      said cover fins having a length corresponding to at least one half of the given length of the stator and a width corresponding with the given width of said stator grooves formed in the stator.

7. The electric motor according to claim 6, wherein said cover cap extends from said bearing plate at least to a front face of said stator facing said bearing plate.

8. The electric motor according to claim 6, wherein said rotor cover includes two said cover caps mounted on respective, mutually opposite bearing plates.

9. The electric motor according to claim 6, wherein said motor is a pump motor.

10. The electric motor according to claim 6, wherein said motor is a drive motor for a water-carrying household appliance.

11. The electric motor according to claim 6, wherein said cover fins extend from said cover cap and rest in said stator grooves formed in said stator.

12. The electric motor according to claim 6, further comprising a further bearing plate, said further bearing plate and said bearing plate forming a housing.

13. The electric motor according to claim 6, further comprising an integral component including said cover cap and said cover fins mounted to said end of said cover cap; said integral component formed before said cover cap and said cover fins are fitted into the interior space.

\* \* \* \* \*